United States Patent [19]

Oldengott et al.

[11] Patent Number: 4,721,201
[45] Date of Patent: Jan. 26, 1988

[54] TRANSFER STATION WITH FEEDER DEVICE HAVING PIVOTABLE BOX COMPARTMENT AND COOPERATING METERING HUMPS

[75] Inventors: Michael Oldengott, Witten; Klaus Schäffer, Marl, both of Fed. Rep. of Germany

[73] Assignee: Klöckner-Becorit GmbH, Castrop-Rauxel, Fed. Rep. of Germany

[21] Appl. No.: 898,091

[22] Filed: Aug. 20, 1986

[30] Foreign Application Priority Data

Aug. 22, 1985 [DE] Fed. Rep. of Germany ....... 3529949

[51] Int. Cl.⁴ ............................................. B65G 47/20
[52] U.S. Cl. ................................... 198/535; 414/327; 414/574
[58] Field of Search ............... 198/311, 535, 536, 540, 198/547, 735; 414/376, 573, 574, 327

[56] References Cited

U.S. PATENT DOCUMENTS 2,606,646  8/1952  Madeira ............................ 198/735
2,753,058  7/1956  Potthoff et al. .................... 198/535
4,059,195  11/1977  MacDonald et al. ............... 414/376
4,669,674  6/1987  Oldengott et al. ................. 414/574

FOREIGN PATENT DOCUMENTS 1266215  4/1968  Fed. Rep. of Germany ...... 198/735
1947520  11/1971  Fed. Rep. of Germany ...... 198/535

Primary Examiner—Joseph E. Valenza
Attorney, Agent, or Firm—Watson, Cole, Grindle & Watson

[57] ABSTRACT

A mobile transfer station includes a support structure; a conveyor movably mounted on the support structure; and a feeder device located on one side of the conveyor, the feeder device including a box compartment for receiving bulk materials to be treated by the mobile transfer station and which is pivotally mounted on the support structure to be tilted relative to the conveyor to deposit bulk materials thereon, and metering humps mounted on the support structure and fitting within recesses in the box compartment, the metering humps having upper surfaces which are inclined downwardly toward the conveyor.

4 Claims, 3 Drawing Figures

TRANSFER STATION WITH FEEDER DEVICE HAVING PIVOTABLE BOX COMPARTMENT AND COOPERATING METERING HUMPS

BACKGROUND OF THE INVENTION

1. Field of the Invention

The present invention relates to a mobile transfer station which receives and treats bulk materials and which includes a conveyor and a feeder device located on at least one side of the conveyor, the feeder device including a box compartment which can receive bulk materials to be treated and which can tilt relative to the conveyor to deposit the bulk materials onto the conveyor.

2. The Prior Art

A mobile transfer station of the noted type is disclosed in U.S. Pat. No. 4,669,674. This mobile transfer station includes a conveyor which is driven by two hydraulic motors, a feeder device which receives and then deposits bulk materials onto the conveyor, a crusher mechanism for crushing the bulk materials which are conveyed thereto by the conveyor, a connecting trough for discharging the crushed bulk materials onto a separate removal conveyor, and an optional control compartment. The feeder device includes a support structure adjacent to one side of the conveyor, a box compartment which is mounted on the support structure to be pivotable about an axis which extends in parallel with the conveyor, and a lifting cylinder for tilting the box compartment relative to the conveyor. When the box compartment is in a non-tilted (horizontal) position, a dump truck can deposit the bulk materials to be treated therein. Thereafter, the lifting cylinder can be pressurized to lift the box compartment and tilt it relative to the conveyor so that the bulk materials therein will slide onto the conveyor located diagonally therebelow. The lifting cylinder can then be depressurized to cause the box compartment to return to its non-tilted (horizontal) position. A stationary wall can be located on the opposite side of the conveyor relative to the noted box compartment.

SUMMARY OF THE INVENTION

It is an object of the present invention to provide a transfer station of the noted type wherein the feeder device thereof is constructed such that the bulk materials therein to be treated can be discharged onto the conveyor therefrom in measured quantities.

According to the present invention the transfer station includes a supporting structure which supports the conveyor and the box compartment, and metering humps which are mounted on the supporting structure, these metering humps having upper surfaces which are inclined downwardly toward the conveyor and are attached at an angle thereto. These metering humps prevent the contents of the box compartment from being discharged therefrom all at once and thus act to prevent an overloading of the conveyor. This also means that the box compartment cannot be refilled before it is completely empty. In this way, the box compartment constitutes a buffer or storage area for the bulk materials to be treated.

In one embodiment of the invention each of the metering humps has the form of a portion of a cylinder, and the box compartment has recesses therein to accommodate each of the metering humps. These recesses are dimensioned to correspond to the dimensions of the metering humps to prevent bulk materials from dropping therebetween and causing operational problems.

The transfer station can advantageously include a ground plate below the box compartment which is pivotally mounted on the support structure and at least one lifting cylinder positioned between the ground plate and the box compartment. This makes it possible, in case the box compartment is fixed in its tilted, discharge position, to lift the floor panel so that the transfer station rests only on the support structure, which simplifies matters if the transfer station is to be moved as a unit.

In another embodiment of the invention, the mobile transfer station includes a pivoting backing wall on the side of the conveyor which is opposite the box compartment. At least one pivoting cylinder is positioned between the support structure and the pivoting backing wall. This makes it possible to adjust the inclination of the pivoting wall relative to the conveyor and best contain the bulk materials to be processed on the conveyor.

The invention will now be better understood by reference to the accompanying drawing, taken in conjunction with the following discussion.

DESCRIPTION OF THE PREFERRED EMBODIMENT

Figure 1:
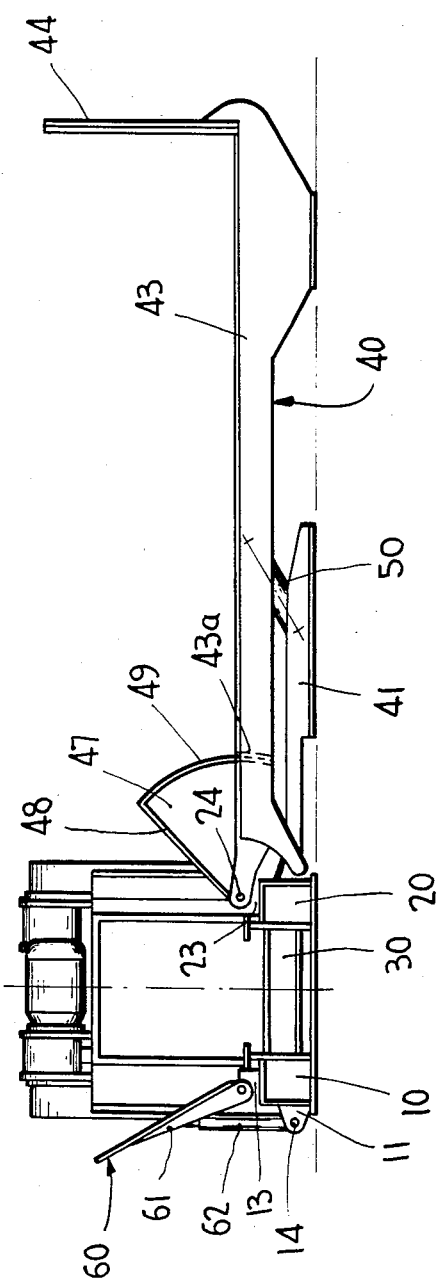
FIG. 1 is a front view of a preferred embodiment of the inventive transfer station with the box compartment of its feeder device in its non-tilted, receiving position.
Figure 2:
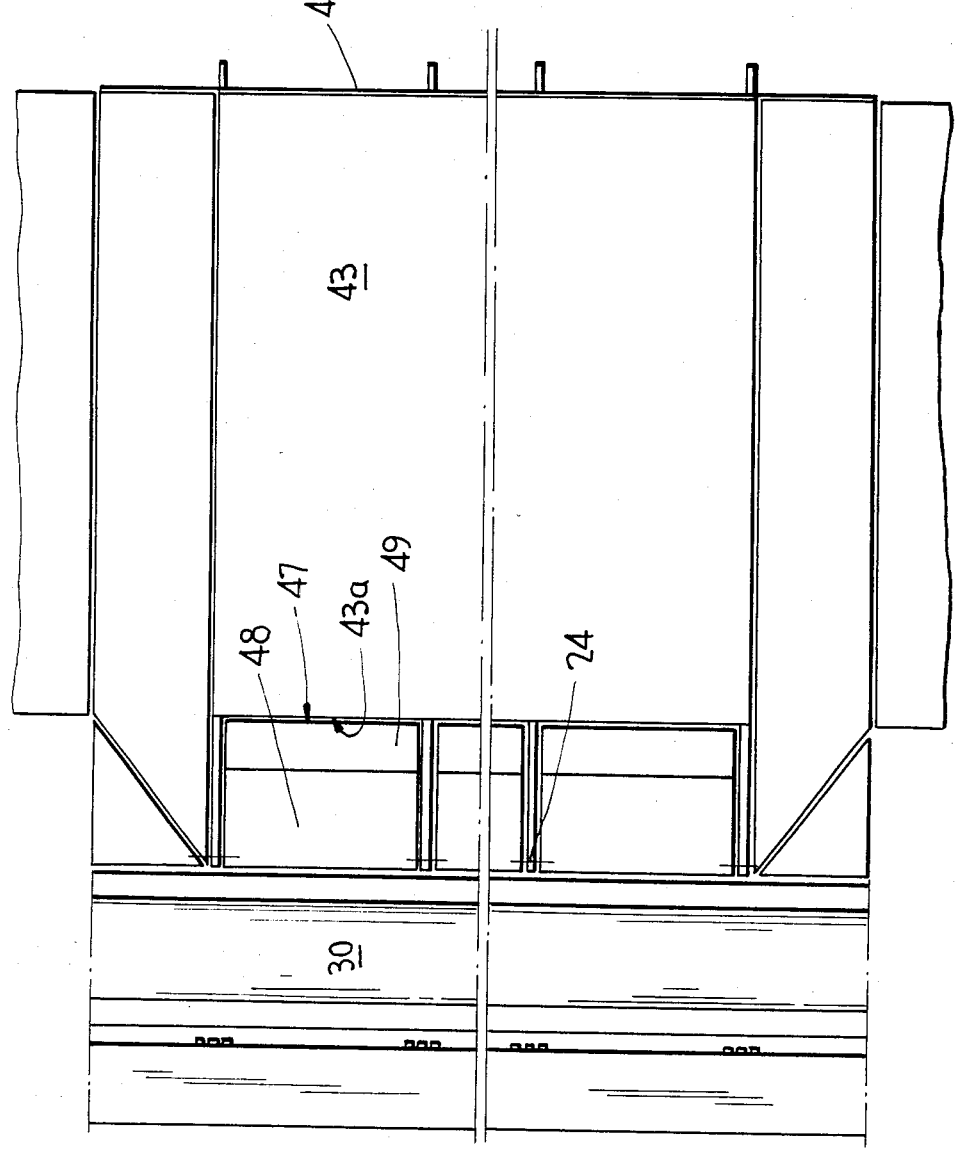
FIG. 2 is a top view of FIG. 1.
Figure 3:
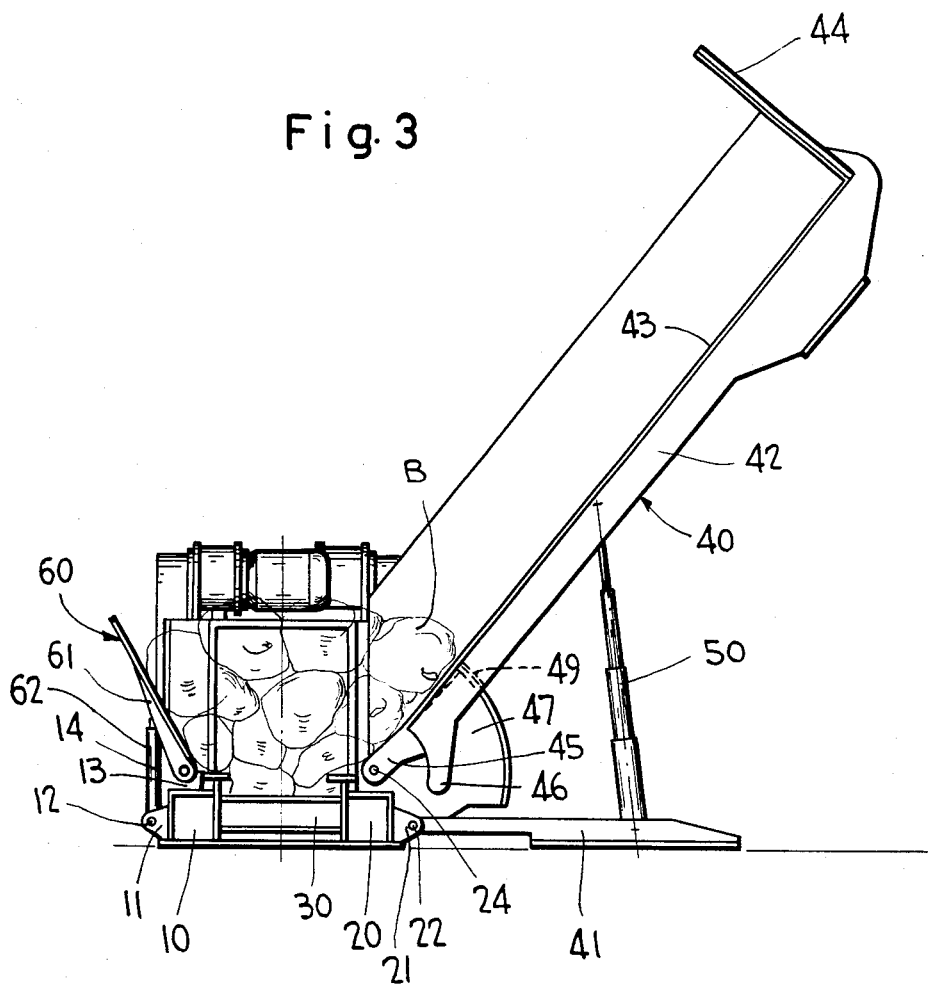
FIG. 3 is a front view similar to FIG. 1 but wherein the box compartment of the feeder device is in its highest tilted, discharge position.

A mobile transfer station according to a preferred embodiment of the present invention is shown in FIGS. 1–3. The transfer station includes a support structure that includes rectilinear beam members 10 and 20, and a chain scraper conveyor 30 movably mounted therebetween. Extending outwardly from the sides of the respective beam members are hinge brackets 11 and 21 which provide first hinge axes 12 and 22 that extend in parallel with beam members, and extending above the respective beam members are hinge flanges 13 and 23 which provide second hinge axes 14 and 24 that also extend in parallel with the beam members.

The mobile transfer station also includes a feeder device 40 for depositing materials to be treated by the transfer station into the chain scraper conveyor 30. This feeder device comprises a ground plate 41 which is connected to the hinge brackets 21 so as to be pivotable about the hinge axis 22, a box compartment 42 positioned above the ground plate 41 and at least one hydraulic lifting cylinder 50 connected between the ground plate 41 and the box compartment 42. The box compartment includes a floor 43, an outer side wall 44, a plurality of support arms 45 which are attached to hinge flanges 23 to pivot about the hinge axis 24, and curved arms 46 which extend downwardly below the support arms 45. The feeder device 40 also includes spaced apart metering humps 47 which are connected to the hinge flanges 23. Each metering hump has a flat upper surface 48 which is inclined downwardly toward the conveyor 30 and a curved side surface 49 which faces away from the conveyor 30. In other words, each metering hump is shaped as a portion of a cylinder (having a generally pie-shaped cross section). The floor 43 of the box compartment 42 includes recesses 43a to accommodate the metering humps. The recesses 43a are suitably dimensioned such that materials located in the box compartment cannot fall between the floor 43 and the curved side surfaces 49 of the metering humps regardless of the degree to which the box compartment is pivoted about the hinge axis 24 by the operation of the hydraulic cylinder 50.

The transfer station also includes a retainer device 60 for retaining bulk materials to be treated on the scraper chain conveyor. This retainer device comprises a wall element 61 which is pivotally connected to the hinge flanges 13 so as to be pivotable about the second hinge axis 14, and hydraulic cylinders 62 which are connected at their upper ends to the wall element 61 and at their lower ends to the hinge brackets 11 so as to be pivotable about the first hinge axis 12.

In operation, and with box compartment 42 in its nontilted, receiving position (see FIG. 1), bulk materials B are loaded onto the floor 43 of the box compartment 42. Then hydraulic cylinder 50 is pressurized so as to lift the box compartment 42 to a certain degree (it pivots about the hinge axis 24), thus allowing some of the bulk materials to pass over the metering humps 47 and onto the scraper chain conveyor 30. As soon as these bulk materials have been moved away, the box compartment 42 is lifted to its highest position so that the remaining bulk materials therein will move past the metering humps 47 and onto the scraper chain conveyor 30. In the meantime, the hydraulic pivoting cylinders 62 are pressurized to a greater or lesser extent to cause the wall element 61 to be in the most advantageous orientation about the second hinge axis 14.

We claim:

1. A mobile transfer station for treating bulk materials which includes a support structure having first and second rectilinear beam members; a conveyor movably mounted between said beam members; and a feeder device for depositing bulk materials to be treated onto said conveyor, said feeder device including (a) a box compartment which is pivotally connected to a first of said beam members to be in a non-tilted receiving position or in tilted discharge positions, said box compartment including a floor which has recesses therein adjacent said first beam member; (b) a ground plate which is pivotally connected to said first beam member and is located below said box compartment; (c) at least one hydraulic lifting cylinder connected between said ground plate and said box compartment; and (d) a plurality of metering humps which are connected to said first beam member and which respectively extend in the recesses in the floor of said box compartment, said metering humps having upper surfaces which are inclined downwardly toward said conveyor, said metering humps functioning to control the discharge of bulk materials from said box compartment onto said conveyor as said box compartment is tilted.

2. A mobile transfer station according to claim 1, wherein each of said metering humps is formed as a portion of a cylinder.

3. A mobile transfer station according to claim 1, including a wall element which is pivotally connected to the second of said beam members.

4. A mobile transfer station according to claim 3, including at least one lifting cylinder connected between said wall element and said second beam member for adjusting the inclination of said wall element relative to said conveyor.

* * * * *